(No Model.)

A. T. BALLANTINE.
Congealer for Ice Making Apparatus.

No. 229,941. Patented July 13, 1880.

Witnesses,
De L. H. Barclay.
W. T. Barrett

Inventor,
A. T. BALLANTINE
by
R. D. Williams.
Attorney.

UNITED STATES PATENT OFFICE.

ALEXANDER T. BALLANTINE, OF PORTLAND, MAINE, ASSIGNOR OF ONE-HALF OF HIS RIGHT TO ROBERT A. RIPLEY, OF SAME PLACE.

CONGEALER FOR ICE-MAKING APPARATUS.

SPECIFICATION forming part of Letters Patent No. 229,941, dated July 13, 1880.

Application filed March 23, 1880. (No model.)

*To all whom it may concern:*

Be it known that I, ALEXANDER T. BALLANTINE, of the city of Portland, Cumberland county, State of Maine, have invented certain new and useful Improvements in Congealers for Ice-Machines; and I hereby declare the same to be fully, clearly, and exactly described as follows, reference being had to the accompanying drawings, in which—

Figure 1:
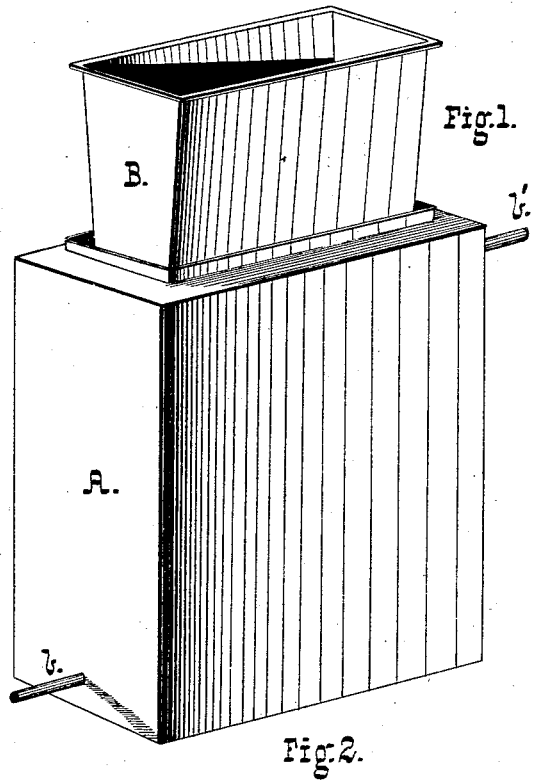
Figure 2:
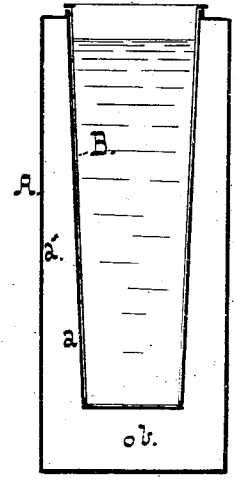

Figure 1 is a perspective view of the device, and Fig. 2 is a central vertical sectional view of the same.

My invention has reference to congealers or molds to be used in connection with machines for the artificial production of ice, and designed to receive the water to be frozen and to turn it out when the congelation is complete in the form of massive blocks of ice.

The object of my invention is to furnish a congealer in which the water will be more readily and expeditiously frozen than has been possible with the forms of congealers heretofore used, advantage being taken of a physical law which seems hitherto to have been ignored.

As conducive to a clear understanding of the exact nature and scope of my invention, in contradistinction to others of the same general class, it may be stated that heretofore the congealers have been constructed in the form of sheet-metal cases, which, being filled with water, were subjected to the action of the frigorific medium either by direct immersion in a cold non-congealable liquid, such as chloride of calcium solution, or by direct action of a gas or vapor rendered cold by expansion.

The difficulties in the way of the ready removal of the molds when their contents were completely frozen have been serious obstacles in the practical manufacture of ice. By my invention they are completely overcome, and other advantages are secured, as hereinafter set forth.

It is well known that water is an exception to the general rule that bodies expand by heat and contract by cold. At about 39° Fahrenheit water reaches its maximum density, and upon being cooled below that point no longer contracts, but expands. As a result the convective currents caused by a further cooling stop short of that level in the body of water to which it has been cooled to 39°. In congealers, therefore, the body or mass of the refrigerant should be at the lower portion of the mold, instead of being distributed, as is usual, pretty evenly about it. To this latter mechanical defect is due, mainly, the observed fact that the water in the central and lower portion of the mold obstinately refuses to freeze, and a solid block of ice is only to be obtained by pushing the working of the machine far beyond the point indicated by theory.

The mold about to be described is designed with special reference to use in connection with a so-called "ammonia ice-machine," though it is applicable for use with others.

In the accompanying drawings, A is a casing having inner and outer walls, $a$ $a'$, and inlet and outlet pipes $b$ $b'$ at respectively the lower and upper sides. It is suitably jacketed to prevent loss of cold by radiation. The inner walls converge slightly, as shown, so that the area inclosed by them and the outer walls is greatest at the bottom.

B is the mold proper, consisting of a sheet-metal casing adapted to exactly fit within the inner shell of the casing A, its walls resting, when in place, in contact with the inner walls, $a$. The mold is provided with suitable handles, by which it is removed when its contents are frozen.

In operation the refrigerant being led into the casing A, the mold is filled and placed therein. Convective currents are immediately set up in the water and continue throughout its mass until the whole is frozen solid, when the casing B is removed and a new one is inserted. As the casings B are of sheet metal and quite light, but little cold is carried away by them, as it were, and wasted, and all the cost, annoyance, and trouble incident upon the use of an uncongealable liquid are avoided.

What I claim is—

1. A congealer for ice-machines, consisting of an outer double-walled chamber having inlet and outlet for the refrigerant, and a pyramidal or tapering inner chamber or mold fitting closely within the former and removable therefrom, substantially as and for the purpose set forth.

2. A congealer for ice-machines, consisting of a casing having parallel opposite outer walls and tapering or converging inner walls, and constituting a chamber for the refrigerant, in combination with a mold of a size and shape to fit closely within the said casing, and made removable therefrom, as and for the purpose set forth.

ALEXANDER T. BALLANTINE.

Witnesses:
R. D. WILLIAMS,
JOHN C. GITTINGER.